United States Patent [19]
Gilman et al.

[11] 3,999,145
[45] Dec. 21, 1976

[54] OPTICAL CONVERTOR FOR LASER SYSTEMS

[75] Inventors: John J. Gilman, Convent Station; Richard C. Ropp, Warren, both of N.J.

[73] Assignee: Allied Chemical Corporation, Morris Township, N.J.

[22] Filed: Apr. 7, 1975

[21] Appl. No.: 565,891

Related U.S. Application Data

[63] Continuation-in-part of Ser. No. 485,196, July 2, 1974, abandoned.

[52] U.S. Cl. .................. 331/94.5 P; 331/94.5 E; 331/94.5 F; 330/4.3
[51] Int. Cl.² ......................................... H01S 3/091
[58] Field of Search ................. 331/94.5; 330/4.3

[56] References Cited
UNITED STATES PATENTS 3,646,473   2/1972   Young .......................... 331/94.5

FOREIGN PATENTS OR APPLICATIONS 1,136,475   12/1968   United Kingdom .............. 331/94.5

OTHER PUBLICATIONS

Ropp, J. Electrochem. Society, vol. 115, No. 9, 1968, pp. 940–945.
Gaprindashvili et al., Zh. Prikladn'oi Spektrosk, 1972, 17(4), p. 715–718.
Cabezas et al., Applied Physics Letters, vol. 4, No. 2, 15 Jan. 1964, pp. 37–39.
Gaprindashvili, Chem. Abstr. No. 64994v. vol. 8, No. 10, Mar. 12, 1963.
Shul'gin et al., Chem. Abstr. No. 98814x, vol. 79, 1973, p. 466.

*Primary Examiner*—Robert J. Webster
*Attorney, Agent, or Firm*—David W. Collins; John P. Kirby; Arthur J. Plantamura

[57] ABSTRACT

A crystalline optical convertor, adapted to improve the efficiency of a resonant cavity of a laser cavity system, includes: neodymium ions used as lasing ions, a host for the neodymium ions which is used as a laser rod, convertor ions, and a crystalline convertor host. The convertor ions are selected from the group consisting of trivalent dysprosium and trivalent samarium. The crystalline convertor host is selected from the group consisting of: yttrium orthovanadate, yttrium phosphate, yttrium arsenate, yttrium chromate, gadolinium orthovanadate, gadolinium phosphate, gadolinium arsenate, gadolinium chromate and combinations thereof in solid solution. The convertor ions act as an activator for the crystalline convertor host. The combination of neodymium ions and neodymium host is arranged separate from the combination of the convertor ions and the convertor host. The optical convertor is used to convert input electromagnetic radiation not readily absorbed by the neodymium ions to a wavelength which approximately matches the excitation wavelength of the neodymium ions.

9 Claims, 3 Drawing Figures

OPTICAL CONVERTOR FOR LASER SYSTEMS

This application is a continuation-in-part application of Ser. No. 485,196 filed July 2, 1974, now abandoned.

BACKGROUND OF THE INVENTION

This invention relates to a method and apparatus for the use of certain crystalline phosphor compositions in the laser field. The term "phosphor compositions" herein refers to compositions that convert energy into electromagnetic radiation of desired wavelength. The term "laser" means light amplification by stimulated emission of radiation. More particularly, this invention relates to certain crystalline phosphor compositions which are suitable for use as an optical convertor in a laser cavity system, for example, a laser system using a lasing host material such as yttrium aluminium garnet ($Y_3Al_5O_{12}$), known as "YAG". In general, the crystalline optical convertor is used to absorb input electromagnetic radiation not normally absorbed by the lasing ion and convert it to a wavelength which is more readily usable by optically active lasing ions, such as neodymium ions ($Nd^{3+}$), in the laser system. More specifically, when the lasing ions are neodymium ions ($Nd^{3+}$), the crystalline optical convertor changes electromagnetic energy having a wavelength of less than about 4000 A. to electromagnetic energy having a wavelength between about 5500 A. and 8500 A., where A. indicates Angstrom units.

Solid-state laser systems of the prior art are inefficient energy convertors because much of the input electromagnetic radiation does not have the same wavelength as the pumpband of the laser rod material. Therefore, it is desirable to find a way to compress the broad-band input radiation into a relatively narrow band of wavelengths that match the pumpband of the laser rod. Optical convertors for the laser cavity have been known in the prior art, but they have not been very successful heretofore. Most of the optical convertors known in the art have been organic materials. Even these have been used only for certain specific cases. Most of the solid state laser systems use neodymium ($Nd^{3+}$) ions incorporated in a suitable matrix to form a laser rod. The organic optical convertors of the prior art are nearly useless when the lasing ions are neodymium ($Nd^{3+}$) ions.

Laser cavity systems consist of three main components: the laser rod, the pump lamps, and an internal parabolic reflecting surface for focussing the pump light on the laser rod to cause the neodymium ($Nd^{3+}$) ion to emit coherent light in a laser beam. Coherent light refers to an organization of energy waves emitted by a stimulated atom so that they travel in the same direction, at the same frequency, and perfectly in step with the stimulating radiation.

SUMMARY OF THE INVENTION

The crystalline optical convertor of the present invention is adapted to improve the efficiency of a resonant cavity of a laser cavity system. The crystalline optical convertor includes neodymium ions, a host for the neodymium ions, convertor ions, and a crystalline convertor host. The neodymium ions act as lasing ions. The host for the neodymium ions is arranged in combination with the neodymium ions. The neodymium host acts as a laser rod. The convertor ions are selected from the group consisting of trivalent dysprosium and trivalent samarium. The crystalline convertor host is a host for the convertor ions. The convertor ions act as an activator for the crystalline convertor host. The combination of neodymium ions and neodymium host is arranged separate from the combination of the convertor ions and the convertor host. Such a combination of convertor ions in a convertor host is known as a phosphor composition. A solid solution of certain phosphor compositions, which include a crystalline host material in combination with an activator for the crystalline host material, formed into an optical convertor for incorporation into the laser cavity has been found to materially increase the overall efficiency of the laser cavity system. The particular phosphor compositions which have been found useful as optical convertors in a neodymium ($Nd^{3+}$) ion activated laser cavity system include a crystalline host material selected from the group consisting of: yttrium orthovanadate, yttrium phosphate, yttrium arsenate, yttrium chromate, gadolinium orthovanadate, gadolinium phosphate, gadolinium arsenate, gadolinium chromate and combinations in solid solution of the foregoing compounds, activated by trivalent dysprosium ($Dy^{3+}$) or trivalent samarium ($Sm^{3+}$). These crystalline phosphor compositions used as optical convertors are stable under the extreme high radiation densities of the laser cavity. They are transparent in the wavelength region of the neodymium ($Nd^{3+}$) ion absorption and excitation lines. They absorb non-utilized radiation in other regions of the light spectrum and convert such radiation into light easily absorbed by the neodymium ($Nd^{3+}$) ion. The crystalline phosphor compositions may be employed as a crystalline transparent tube or as a crystalline transparent film on a quartz or glass tube. The tube is slipped over the laser rod. The crystalline phosphor compositions may also be applied as a film to the laser rod.

It is important that the convertor host be crystalline since the efficiency of the convertor activator ions are dependent upon this property. Further, the optical convertor and laser rod must be two separate entities, subsequently combined to form the improved laser cavity system of this invention. The present invention also includes the following method: combining lasing ions in a lasing host for the lasing ions; combining convertor ions in a convertor host for the convertor ions; and maintaining the combination of lasing ions in a lasing host separate from the combination of convertor ions in a convertor host. The method further includes: converting input electromagnetic radiation not readily absorbed by the lasing host to a wavelength which approximately matches the excitation wavelength of the lasing ions.

DETAILED DESCRIPTION

Figure 1:
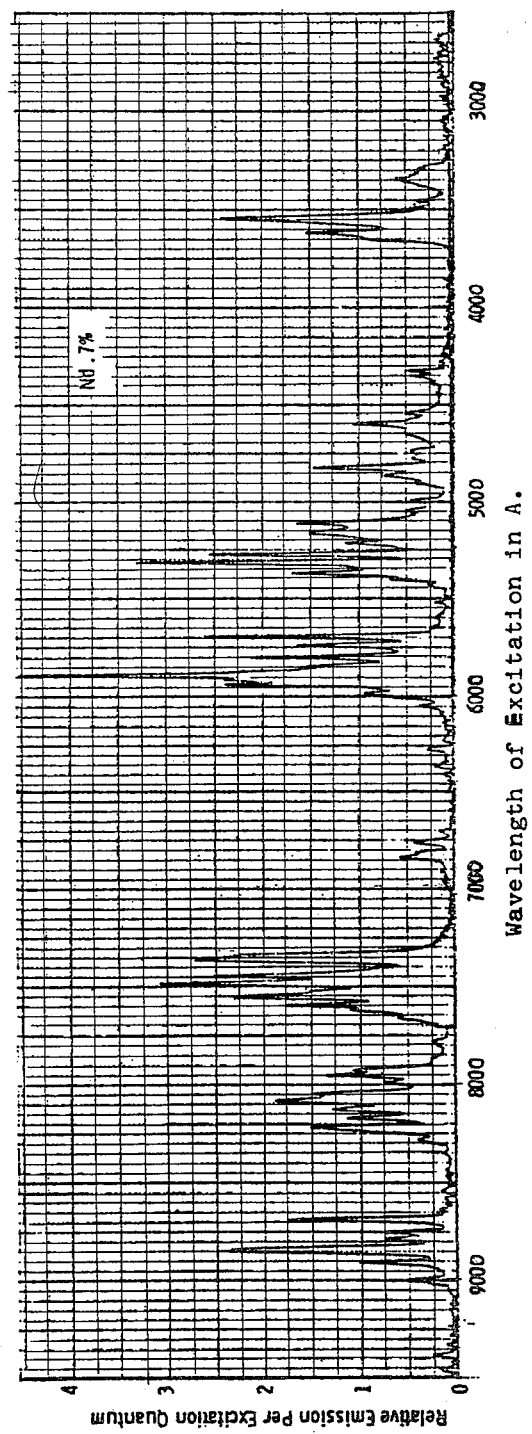
FIG. 1 is a graph depicting the excitation of the laser rod at the lasing wavelength of the neodymium ion for specific wavelengths of excitation.

In order to increase the overall efficiency of a laser cavity system which uses a laser rod having lasing neodymium ions in a host material for the lasing ions, the method of this invention includes converting unused input electromagnetic radiation to a wavelength which approximately matches the excitation wavelength of the lasing neodymium ions of the laser rod. As a result, the electromagnetic radiation after conversion is readily absorbed by the lasing ions. In a laser cavity system in which the lasing ions are neodymium ($Nd^{3+}$) ions, unused input electromagnetic radiation having a wavelength of less than about 4000 A. is converted to electromagnetic radiation having a wavelength between 5500 A. and 8500 A. As a result, the electromagnetic radiation after conversion approximately matches the excitation wavelength of the neodymium ions and is readily absorbed by the neodymium ions.

A solid solution of certain phosphor compositions, which include a crystalline host material in combination with an activator for the crystalline host material, may be used as an optical convertor to absorb unused light and convert it into a wavelength which is readily absorbed by the neodymium ($Nd^{3+}$). By crystalline, we mean a state of matter in which the component atoms are arranged in an orderly array, thereby giving rise to sharp diffraction peaks when subjected to electromagnetic radiation having wavelengths in the X-ray region (1/100 A. to 50 A. wavelength). Of the phosphor compositions available for use with laser rods, only certain specific phosphor compositions possess the required stability and optical properties to be successful as an optical convertor for the lasing neodymium ($Nd^{3+}$) ion incorporated in a suitable lasing host material, such as yttrium aluminium garnet (YAG). The lasing host material (YAG) for the neodymium ($Nd^{3+}$) is not to be confused with the crystalline host compound which is part of the phosphor composition used as the optical convertor. The neodymium ($Nd^{3+}$) ion is the activator for the lasing host material and is not to be confused with the activator for the convertor host compounds. The laser material which combines the foregoing example of the activator and the lasing host is referred to as YAG:Nd. The neodymium lasing ion can be incorporated within either an amorphous or crystalline host. It is known in the art that certain ions act as sensitizers for the lasing neodymium ions when incorporated into the same host. It is an important part of the present invention that the lasing neodymium ions and the convertor ions of the present invention are incorporated each in its own host. The host for the lasing neodymium ion can be either crystalline or amorphous. The host for the convertor ion must be crystalline. In the following description, the crystalline host for the convertor ion in combination with the convertor ions is referred to as a phosphor composition.

The phosphor compositions for this invention include a convertor host compound selected from the group consisting of those listed in the following Table:

TABLE I yttrium orthovanadate ($YVO_4$)
yttrium phosphate ($YPO_4$)
yttrium arsenate ($YAsO_4$)
yttrium chromate ($YCrO_4$)
gadolinium orthovanadate ($GdVO_4$)
gadolinium phosphate ($GdPO_4$)
gadolinium arsenate ($GdAsO_4$)
gadolinium chromate ($GdCrO_4$)

and any combination in solid solution of the foregoing compounds. The phosphor compositions for this invention further comprises an activator for the crystalline convertor host compounds such as trivalent dysprosium ($Dy^{3+}$) or trivalent samarium ($Sm^{3+}$). Dysprosium ($Dy^{3+}$) and samarium ($Sm^{3+}$) have been selected as activators because their emission lines closely match the excitation lines of the lasing ions, the neodymium ($Nd^{3+}$) ions, in YAG:Nd. The foregoing host compounds have been selected because they provide a high degree of efficiency when used with the foregoing activators in the conversion of electromagnetic radiation. Optical convertors using such phosphor compositions (host and activator) change electromagnetic radiation having a wavelength of less than about 4000 A. to electromagnetic radiation having a wavelength between about 5500 A. and 8500 A. Neodymium (atomic number 60), gadolinium (atomic number 64), samarium (atomic number 62), and dysprosium (atomic number 66), are among the rare earth elements. Yttrium (atomic number 39), although not a rare earth element is found in nature with the rare earth elements.

The molar ratio of cations (yttrium, gadolinium, dysprosium and/or samarium) to anions (orthovanadate, arsenate, phosphate and/or chromate) in the crystalline phosphor compositions should preferably be in the range of 0.99 to 1.01 and preferably a ratio of 1.00 to 1.00, that is, with a maximum variance of 0.01. The amount of activator, dysprosium or samarium, is preferably in the range of about 0.001 mole percent to 5.0 mole percent, based on the total phosphor composition. Yttrium orthovanadate, gadolinium orthovanadate, yttrium arsenate, and gadolinium arsenate have been found to be more efficient than yttrium phosphate and gadolinium phosphate in converting light by a factor of 10 to 20 times.

Methods of preparing some of these phosphor compositions in the form of powders are disclosed in the following U.S. Pat. Nos. to R. C. Ropp: 3,501,412; 3,630,946; and 3,580,861. The foregoing patents do not disclose how to use the disclosed phosphor compositions as an optical convertor in a laser system. These patents disclose phosphor compositions which convert energy into visible light, but do not disclose how to use these compounds to absorb unused radiation and convert it into radiation easily absorbed by the neodymium ions in a laser system. Since the phosphor compositions disclosed in these patents are powders, they cannot be used directly in a laser system because the particles of the powder would cause scattering of light. Further, these patents do not disclose the use of a tube formed of these phosphor compositions and deposited on a tube or on the laser rod.

As an example of the phosphor compositions useful for this invention, yttrium orthovanadate ($YVO_4$), activated by trivalent dysprosium ($Dy^{3+}$) which is indicated by $YVO_4$:Dy is a suitable phosphor composition for use as an optical convertor for YAG:Nd laser rods. Another suitable phosphor composition is yttrium orthovanadate ($YVO_4$) activated by trivalent samarium ($Sm^{3+}$), which is indicated by $YVO_4$:Sm. An even more suitable phosphor composition is gadolinium orthovanadate ($GdVO_4$) activated by trivalent dysprosium ($Dy^{3+}$), which is indicated by $GdVO_4$:Dy; or gadolinium orthovanadate ($GdVO_4$) activated by trivalent samarium ($Sm^{3+}$), which is indicated by $GdVO_4$:Sm. $GdVO_4$:Sm and $GdVO_4$:Dy are more suitable in this application to the laser cavity because their emission lines more closely match the excitation lines of the neodymium ($Nd^{3+}$) ions in YAG:Nd.

The neodymium ($Nd^{3+}$) ion is a rare earth ion and shows discrete sets of absorption lines throughout the visible light spectrum. The lasing wavelength of neodymium ($Nd^{3+}$) ion is 10,650 A. for absorptions between 5000 A. and 8000 A. The strongest absorptions occur at about 7500 A., 8100 A. and 8850 A. However, the strongest excitation, which is measured as emission intensity as a function of exciting wavelength, occurs at 5900 A. FIG. 1 shows the excitation of the 10,650 A. wavelength emission of a single crystal of $Y_3Al_5O_{12}$:Nd at 300° K. and having 0.7 mole percent neodymium based upon the total compound. The excitation is shown in terms of relative emission per excitation quantum along the vertical axis as a function of wavelength of excitation along the horizontal axis expressed in Angstrom units. Absorption occurs only at specific wavelengths between 5650 A. and 5950 A.

Xenon flash lamps are generally employed as the pump media. Their output extends in a broad band from about 2000 A. to beyond 9000 A., peaking at about 4500 A. A considerable amount of input electromagnetic radiation from the pump lamps is wasted, since only those wavelengths which coincide with the neodymium ($Nd^{3+}$) ion bands are absorbed. Because of the selective absorptions of the neodymium ($Nd^{3+}$) ion, the overall efficiency of the laser cavity is less than 2%. For example, for 100 watts of input radiation, less than 2 watts of laser light are obtained.

The ideal optical convertor for neodymium doped yttrium aluminium garnet (YAG:Nd) would be one which absorbed all radiation less than about 5000 A. and re-emitted the energy between about 5500 and 8500 A. To possess this property, the phosphor compositions should have a small difference between the first excited state and the emitting state. This difference is called the "Stark Shift" and is a function of the activator. Among the activators considered in this respect were the cuprous ion, the europous ion and the terbium ion, incorporated into a suitable host, such as calcium sulfide (CaS), calcium strontium sulfide ($CaSrS_2$), strontium pyrophosphate ($Sr_2P_2O_7$), or strontium fluorophosphate ($Sr_5F(PO_4)_3$). Examples of phosphor compounds having the foregoing activators are CaS:$Eu^{2+}$, $CaSrS_2$:$Eu^{2+}$, $Sr_2P_2O_7$:$Cu^+$:$Tb^{3+}$, and $Sr_5F(PO_4)_3$:$Cu^+$. None of these phosphor compounds were found sufficiently stable within the laser cavity because of the ease of oxidation of $Cu^+$ to $Cu^{2+}$, $Eu^{2+}$ to $Eu^{3+}$, $Tb^{3+}$ to $Tb^{4+}$. Even organic phosphors of the prior art are unstable under the conditions of the laser cavity. Water is used to cool the laser rod and the sulfide phosphors mentioned above are soluble in water, as are some of the organic phosphors of the prior art.

Of the particular crystalline phosphor compositions which have been found suitable as optical convertors, 99.7 mole percent of yttrium orthovanadate ($YVO_4$) activated by trivalent dysprosium as 0.3 mole percent $DyVO_4$ in solid solution with the $YVO_4$, as an example, has an absorption band from 3500 A. to below 2000 A., emits 90% of its radiation at 5750 A., and has a quantum efficiency of about 80%. 99.7 mole percent of gadolinium orthovanadate activated by trivalent dysprosium as 0.3 mole percent $DyVO_4$ in solid solution with the $GdVO_4$ is even more suitable as an optical convertor for the yttrium aluminium garnet composition (YAG:Nd) since its emission lines lie at 5850 A., with a quantum efficiency of about 85%. Combinations in solid solution of the various crystalline compounds of Table I do not shift the emission lines of trivalent dysprosium ($Dy^{3+}$) materially, but do affect the absorption (excitation) bands and quantum efficiencies. Particularly efficacious combinations of the compounds shown in Table I are yttrium orthovanadate and yttrium phosphate ($YVO_4$:$YPO_4$); yttrium orthovanadate and yttrium arsenate ($YVO_4$:$YAsO_4$); gadolinium orthovanadate and gadolinium phosphate ($GdVO_4$:$GdPO_4$); and gadolinium orthovanadate and gadolinium arsenate ($GdVO_4$:$GdAsO_4$).

The incorporation of an optical convertor composition into the laser cavity has certain requirements. In addition to stability, the optical convertor must be transparent in the 5000 - 9000 A. region. Any scattering losses will seriously reduce the laser cavity efficiency. Therefore, particulates cannot be employed. A formed optically transparent crystalline film composed of one of the phosphor compositions of this invention is placed on the outside surface of a transparent quartz or glass tube of suitable size. The tube is then slipped over the laser rod. The crystalline film may also be placed on the inside surface of the quartz or glass tube. The glass may be any type of glass except high lead glass. The refractive index of the glass may be matched to the refractive index of the laser crystal. In this manner, it has been found that the crystalline phosphor compositions of this invention can be successfully employed in the laser cavity.

It is important that the optical convertor and laser rod, or lasing element, be maintained as separate entities, combined subsequently to form the present invention. If the activator ion and lasing ion are incorporated within the same host, the resulting efficiency is greater than that obtained with the lasing ion alone, as is known in the art, but is much less than that achieved in the present invention.

Figure 2:
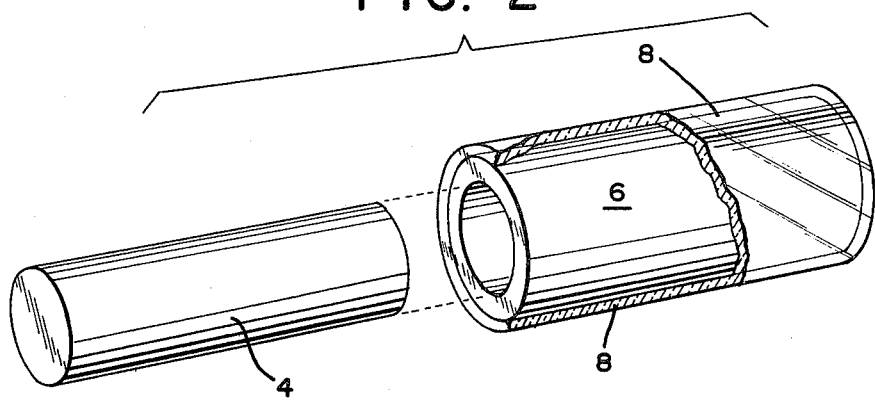
FIG. 2 is a schematic illustration of the laser rod and a tube adapted for using certain phosphor compositions.
Figure 3:
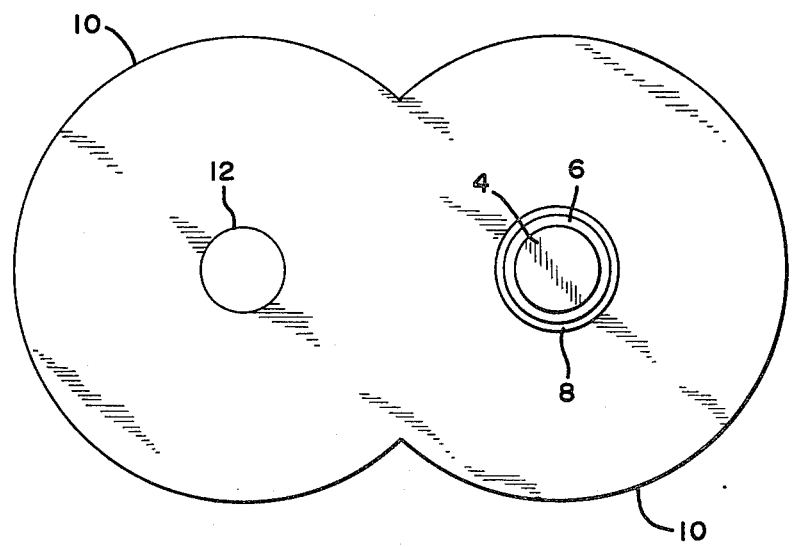
FIG. 3 is a schematic illustration of a laser cavity in which the laser rod and tube of FIG. 2 are used.

FIG. 2 illustrates the method and apparatus for using the crystalline phosphor compositions of this invention. FIG. 2 shows laser rod 4 and quartz tube 6 with an optically transparent film 8 composed of one of the phosphor compositions for this invention on the outside surface of the quartz tube 6. FIG. 3 is a schematic illustration of a laser cavity 10 in which the laser rod 4 and the tube 6 of FIG. 2 are used. FIG. 3 also shows pump lamp 12. An alternate configuration is a transparent tube formed by hot-pressing a selected crystalline phosphor composition for this invention in the form of a rod and then coring out the center of the rod.

To form a transparent film, the crystalline phosphor composition is pressed to form a target and then is cathode sputtered by R.F. (radio-frequency) in a suitable vacuum system on the outer surface of a selected quartz tube to form a crystalline luminescent film. Cathode sputtering is a known technique and is described in the Encyclopedia of Chemical Technology, edited by R. E. Kirk and D. F. Othmer, Vol. 8, p. 921 (1952). Care must be exercised to prevent reduction of the materials, especially if vanadates are employed. It is important to obtain transparent film prepared by sputtering technique in a crystalline form. We have prepared essentially amorphous films and have found that the amorphous films achieve only about five percent of the efficiency of the crystalline films. To form a transparent rod for the alternate configuration, the selected compound is hot-pressed at elevated temperatures and pressures for a time sufficient to form a crystalline optically transparent piece. Again, care must be exercised when vanadates are employed as the optical convertor.

As an example, the phosphor composition may include $GdVO_4$:Dy, as well as combinations with YVO$_4$:Dy, activated by about 0.001 mol% to 5.0 mol% based on the total composition, the balance being Gd$^{+3}$ and/or Y$^{+3}$ cations in the total composition. In operation, the transparent tube 6 of FIG. 2 is slipped over the YAG:Nd laser rod 4 and placed in the cavity 10 of FIG. 3. The tube 6 is transparent between about 4000 A. and 8000 A. and passes the major part of the pump light from pump lamp 12 which is utilized by the laser rod 4 in the usual fashion. In addition, the tube 6 absorbs all light below about 3750 A. and converts it to 5750 A., with a quantum efficiency of 85%. The laser is now operated in the normal manner. An efficiency increase of about 20% is achieved. The tube 6 may be allowed to heat up from room temperature to about 250° C. during which time the efficiency of the tube 6 increases. Above about 250° C., the efficiency of tube 6 decreases radically. Therefore, the temperature of the tube 6 should not be allowed to exceed this point and the cooling water flow must be adjusted to maintain temperatures somewhat below about 250° C.

Alternately, the laser rod 4 may be coated with a phosphor composition of this invention to obtain an optically transparent crystalline convertor film on the outer surface of the laser rod 4 for use in the laser cavity 10.

In summary, the present invention has four requirements: The first requirement is that there are two separate ions, the lasing neodymium ion and the optical convertor ion. The optical convertor ion is selected from the group consisting of: trivalent dysprosium and trivalent samarium. The second requirement is that each ion is incorporated within its own host. The third requirement is that the host for the optical convertor ion must be crystalline, whereas the host for the lasing ion (neodymium) need not be crystalline. The fourth requirement is that the region of light absorption of the convertor ion cannot coincide with that of the lasing ion, whereas the emission region of the convertor ion must coincide with the absorption region of the light absorption of the lasing ion.

The fourth requirement fulfills a cascade energy mechanism. The term "cascade" refers to electromagnetic radiation absorbed by the optical convertor ion, re-emitted at a lower energy, re-absorbed at the same energy by the lasing ion, and re-emitted at still a lower energy by the lasing ion (neodymium).

The present invention describes two ions, each capable of its own absorption and emission processes. They are coupled together in a resonant cavity only by direct radiative cascade. Each ion is incorporated in a host matrix in which its absorption and emission processes are most efficient. The cascade convertor ion (Dy$^{+3}$ or Sm$^{+3}$) does not absorb in the region of the absorption bands of the lasing ion (Nd$^{+3}$). Thus, it does not interfere with the optical processes of the lasing ion. The cascade ion emits directly into the absorption bands of the lasing ion, Nd$^{+3}$, hence the term "cascade". The laser cavity is resonant for the emission of the lasing ion Nd$^{+3}$. The light absorbed by the cascade ion is not normally absorbed by the lasing ion. The absorbed light is converted to radiation which is strongly absorbed by the lasing ion and then converted to the lasing frequency in the resonant cavity. This gives rise to the term "unused light", meaning light not normally used by the lasing ion.

We claim:

1. An optical convertor for improving the efficiency of a laser system comprising convertor ions selected from the group consisting of trivalent dysprosium and trivalent samarium dispersed in solid solution in a crystalline convertor host, said convertor host being selected from the group consisting of yttrium orthovanadate, yttrium phosphate, yttrium arsenate, yttrium chromate, gadolinium orthovanadate, gadolinium phosphate gadolinium arsenate, gadolinium chromate and mixtures thereof, said convertor ions acting as an activator for said convertor host to produce substantial emission at a wavelength upon excitation by a source of electromagnetic radiation, said convertor host arranged in said resonant cavity together with a laser host, separate from said convertor host and containing neodymium lasing ions dispersed therein, said lasing ions absorbing at a wavelength substantially identical to said emission wavelength.

2. The optical convertor according to claim 1 wherein said combination of convertor ions and convertor host is in the form of a tube, said tube arranged around the laser rod.

3. The optical convertor according to claim 1 and further comprising an optically transparent tube, said tube having a crystalline film of said combination of convertor ions and convertor host on said tube, said tube being adapted to fit around the laser rod.

4. The optical convertor according to claim 1, said combination of convertor ions and convertor host being in the form of a crystalline film on said laser rod.

5. The optical convertor according to claim 1 wherein said combinations are selected from the group consisting of: yttrium orthovanadate and yttrium phosphate; yttrium orthovanadate and yttrium arsenate; gadolinium orthovanadate and gadolinium phosphate; and gadolinium orthovanadate and gadolinium arsenate.

6. The optical convertor according to claim 1 wherein said combination of convertor ions and convertor host includes cations and anions and the ratio of cations and anions in said convertor combination is in the range of 0.99 – 1.01; and the amount of convertor ions in said convertor combination is in the range of 0.005 mole percent to 5.0 mole percent.

7. A method for increasing the efficiency of a laser system comprising:
combining convertor ions selected from the group consisting of trivalent dysprosium and trivalent samarium in a crystalline convertor host for said convertor ions, said convertor host being selected from the group consisting of yttrium orthovanadate, yttrium phosphate, yttrium arsenate, yttrium chromate, gadolinium orthovanadate, gadolinium phosphate, gadolinium arsenate, gadolinium chromate and mixtures thereof;
arranging said convertor host in said resonant cavity together with a laser host in which lasing neodymium ions have been combined;
maintaining said combination of said lasing ions in said laser host separate from said combination of said convertor ions in said convertor host; and
converting input electromagnetic radiation having a wavelength less than about 4,000 A. and not readily absorbed by said lasing neodymium ions to a wavelength of between about 5500 A. and 8500 A., which approximately matches an excitation wavelength of said lasing neodymium ions.

8. The method according to claim 7 wherein the step of converting unused input electromagnetic radiation comprises providing a convertor tube, said tube including a solid solution of said convertor ions in said crystalline host for said convertor ions and arranging said tube around said laser rod.

9. The method according to claim 8 wherein the step of providing a convertor tube comprises placing said convertor ions and said convertor host on said tube in the form of a transparent film.

* * * * *